US011920800B1

(12) United States Patent
Zhou

(10) Patent No.: US 11,920,800 B1
(45) Date of Patent: Mar. 5, 2024

(54) ELECTRIC SPACE HEATER

(71) Applicant: MZY LLC, Bear, DE (US)

(72) Inventor: Yun Zhou, Niles, IL (US)

(73) Assignee: MZY LLC, Bear, DE (US)

( * ) Notice: Subject to any disclaimer, the term of this patent is extended or adjusted under 35 U.S.C. 154(b) by 0 days.

(21) Appl. No.: 18/209,216

(22) Filed: Jun. 13, 2023

(51) Int. Cl.
*F24D 13/02* (2006.01)
*H05B 3/22* (2006.01)

(52) U.S. Cl.
CPC ............... *F24D 13/02* (2013.01); *H05B 3/22* (2013.01)

(58) Field of Classification Search
CPC .. F24D 13/02; H05B 3/22; H05B 3/23; H05B 3/26; H05B 3/84; H05B 3/20; H05B 3/68; H05B 3/78; H05B 3/74; H05B 2203/031; H05B 2203/013; H05B 2213/07; H05B 2213/03; H05B 2214/02
See application file for complete search history.

(56) References Cited

U.S. PATENT DOCUMENTS

2004/0175163 A1* 9/2004 Fukai .................... F24D 13/022 392/435
2009/0105605 A1* 4/2009 Abreu .................. A61B 5/6898 600/549
2021/0061066 A1* 3/2021 Funk ........................ H05B 3/22
2022/0136691 A1* 5/2022 Wheatley ................ B32B 17/10 219/220
2023/0193633 A1* 6/2023 Grifhorst .............. E04F 11/002 14/69.5

FOREIGN PATENT DOCUMENTS

WO WO-2019068120 A1 * 4/2019 ............. B32B 13/12

* cited by examiner

*Primary Examiner* — Shawntina T Fuqua

(57) ABSTRACT

An electric space heater having foldable panels is disclosed. A foldable panel may comprise a plural plate-like members and a flexible non-conductive material. The plural plate-like members including (i) a first plate-like member, a second plate-like member, a third plate-like member. The first plate-like member may have a heating element having a first radiation emitting surface and a second interior surface, and (b) a board adhesively bonded to said second interior surface; the second plate-like member may have (a) a heating element having a first radiation emitting surface and a second interior surface, and (b) a board adhesively bonded to said second interior surface; the third plate-like member may have (a) a heating element having a first radiation emitting surface and a second interior surface, and (b) a board adhesively bonded to said second interior surface.

19 Claims, 3 Drawing Sheets

ELECTRIC SPACE HEATER

TECHNICAL FIELD AND INDUSTRIAL APPLICABILITY

The present invention relates to a space heater and, more specifically, to a foldable heating panel in which several small plate-like members are arranged longitudinally, and the foldable heating panel can be folded longitudinally along each small plate-like member so that a panel folding operation and a panel developing operation can be easily performed, thereby facilitating handling of the panel at a time of packaging, transportation, storage, or laying.

BACKGROUND OF THE INVENTION

Space heaters on the market are either noisy or have fire hazard. Indeed, a portable electric heater of the radiant energy type with means for directing air which is to be heated so as to obtain the advantage of distributing heat by convection. Particularly in the case of portable electric heaters of the radiation type, there has been the hazard of fire starting when inflammable material is placed close to such heaters.

Therefore, it would be desirable to reduce or eliminate the possibility of the fire hazard and noise heretofore encountered with portable electric room heaters.

SUMMARY

In one embodiment, a foldable panel may comprise a plural plate-like members and a flexible non-conductive material. The plural plate-like members including (i) a first plate-like member, a second plate-like member, a third plate-like member. The first plate-like member may have a heating element having a first radiation emitting surface and a second interior surface, and (b) a board adhesively bonded to said second interior surface; the second plate-like member may have (a) a heating element having a first radiation emitting surface and a second interior surface, and (b) a board adhesively bonded to said second interior surface; the third plate-like member may have (a) a heating element having a first radiation emitting surface and a second interior surface, and (b) a board adhesively bonded to said second interior surface. The flexible non-conductive material attached to a surface of each of said plural plate-like members so as to interconnect said plural plate-like members such that said plural plate-like members are foldable, from an unfolded condition, into a folded condition by folding said second plate-like member relative to said first plate-like member about said first side of said first plate-like member. A first folding margin member being connected to each of said first plate-like member and said second plate-like member via said flexible non-conductive material. When said plural plate-like members are in the unfolded condition, and said first folding margin member is between said first side of said first plate-like member and said first side of said second plate-like member.

In another embodiment, a foldable panel may comprise a plural plate-like members, in which plural plate-like members includes (i) a first plate-like member having (a) a heating element having a first radiation emitting surface and a second interior surface, and (b) a board adhesively bonded to said second interior surface, (ii) a second plate-like member having (a) a heating element having a first radiation emitting surface and a second interior surface, and a flexible non-conductive material attached to a surface of each of said plural plate-like members so as to interconnect said plural plate-like members such that said plural plate-like members are foldable, from an unfolded condition, into a folded condition by folding said second plate-like member relative to said first plate-like member about said first side of said first plate-like member. The foldable panel further comprise a backing material attached to the board of the first plate-like member; the board of the second plate-like member; and a first folding margin member being connected to each of said first plate-like member and said second plate-like member via said flexible non-conductive material. When said plural plate-like members are in the unfolded condition, and said first folding margin member is between said first side of said first plate-like member and said first side of said second plate-like member.

Optionally in any embodiment, the foldable panel further comprises a fourth plate-like member having (a) a heating element having a first radiation emitting surface and a second interior surface, and (b) a board adhesively bonded to said second interior surface.

Optionally in any embodiment, the foldable panel further comprises a fifth plate-like member having (a) a heating element having a first radiation emitting surface and a second interior surface, and (b) a board adhesively bonded to said second interior surface.

Optionally in any embodiment, the foldable panel further comprises a second folding margin member connected to said second plate-like member and said third plate-like member via said flexible non-conductive material.

Optionally in any embodiment, the plural plate-like members are each rectangular in shape such that said plural plate-like members, by being interconnected by said flexible non-conductive material, define a quadrangular configuration.

Optionally in any embodiment, the foldable panel further comprises a third folding margin member connected to said second plate-like member and said third plate-like member via said flexible non-conductive material.

Optionally in any embodiment, the foldable panel further comprises a fourth folding margin member connected to said second plate-like member and said third plate-like member via said flexible non-conductive material.

Optionally in any embodiment, the foldable panel further comprises a backing material attached to the board of the first plate-like member; the board of the second plate-like member; and the board of the third plate-like member.

Optionally in any embodiment, the backing material is further attached to the board of the fourth plate-like member Optionally in any embodiment, the backing material is further attached to the board of the fifth plate-like member.

Optionally in any embodiment, the foldable panel further comprises an electronic control system, wherein the control system comprise an accelerometer.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
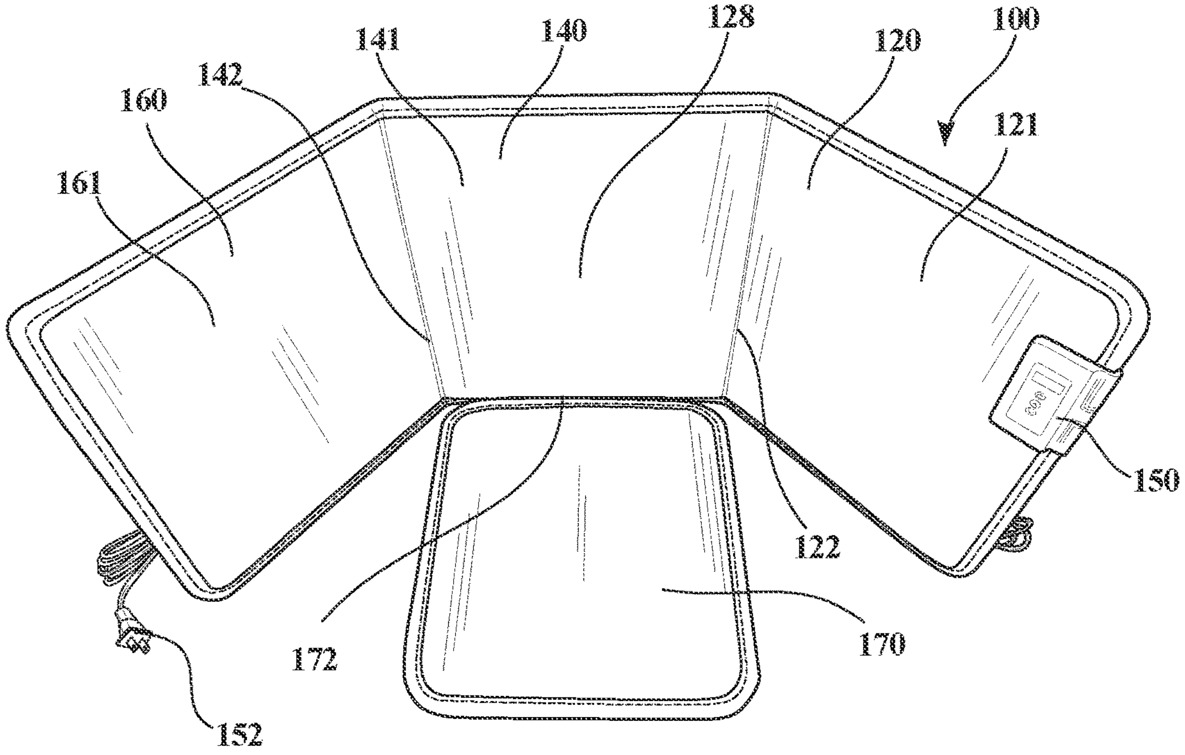
FIG. 1 is a perspective view of a foldable electric panel in unfolded position according to an embodiment.

Before the description of the embodiment, terminology, methodology, systems, and materials are described; it is to be understood that this disclosure is not limited to the particular terminologies, methodologies, systems, and materials described, as these may vary. It is also to be understood that the terminology used in the description is for the purpose of describing the particular versions of embodiments only, and is not intended to limit the scope of embodiments. For example, as used herein, the singular forms “a,” “an,” and “the” include plural references unless the context clearly dictates otherwise. In addition, the word “comprising” as used herein is intended to mean “including but not limited to.” Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term “about”. Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

A foldable space heater for carrying out the present invention will be described in more detail. In a foldable space heater according to a first aspect of the invention, several small plate-like members which are rectangular in plan view are arranged longitudinally and laterally so as to be adjacent to each other, with a combination of the plate-like members defining a panel that is quadrangular in plan view. There is no particular restriction regarding this quadrangular configuration as long as folding is possible in both longitudinal and lateral directions. The quadrangular configuration may be a square or a rectangle, whose four corners are substantially right angles, or a trapezoid, or a rectangle or trapezoid with rounded corners. As to a size of this panel, it can be appropriately determined according to size of an office, living room or bed room. For example, it may be a size for about 51 inches in fully open length and about 22 inches in height, for example.

In principle, at least three small plate-like members are arranged in a longitudinal direction, and optionally one small plate-like members are arranged in a lateral direction. The panel may be folded longitudinally and laterally into a size substantially corresponding to a single small plate-like member for packaging, transportation, storage, or laying. Thus, it is desirable for an area of a single small plate-like member to be of such size as to facilitate this packaging, transportation, storage, and laying. For example, the single small plate-like member may be approximately 22 inches× 11 inches.

Material of these small plate-like members can be selected from among synthetic resin, hard rubber, wood, metal, plaster, and the like. The synthetic resin may be a thermoplastic synthetic resin or a thermosetting synthetic resin, or it may be a foam or a non-foam resin. Examples of the foam resin include highly rigid foams, such as a cross-linked rubber foam and a thermosetting resin foam, a non-cross-linked polyethylene, a non-cross-linked rubber foam, a polystyrene foam, a foam of a mixture of high-density polyethylene and polystyrene. The wood may be plywood. Examples of the metal include iron and aluminum.

Several small plate-like members are arranged so as to be longitudinally and laterally adjacent to each other.

A longitudinal folding portion of the panel is formed by opposing narrow side portions of the small plate-like members. That is, the longitudinal folding portion is formed by bringing the narrow side portions of the small plate-like members.

A lateral folding portion of the panel is formed by opposing wide side portions of small plate-like members, with a narrow and elongated folding margin member existing between these wide side portions. That is, this lateral folding portion is formed by providing folding margin member between the opposing wide side portions of the small plate-like members.

Folding margin members provided between one lateral row of small plate-like members of the panel are connected to adjacent small plate-like members, and function as folding portions that allow folding in two steps.

Each of the folding margin members, which are provided between the small plate-like members of another lateral row of small plate-like members of the panel, is connected to only one of adjacent small plate-like members. Due to this connection, the folding margin member is separated from another one of the adjacent small plate-like members, thereby allowing folding onto a connected small plate-like member side. By thus folding the folding margin members as described above, there are created narrow and elongated spaces between the other small plate-like members in the lateral direction of the panel. Due to these narrow and elongated spaces, the panel, when longitudinally folded, can be further easily folded in the lateral direction.

In principle, a length of the folding margin member is substantially the same as a length of the wide side portion of each small plate-like member. However, it may be made somewhat smaller considering ease of longitudinal folding. When a width of the folding margin member is too small, folding is rather hard to perform at a time of folding in two steps {folding margin member}, and a sufficient space cannot be created between laterally adjacent small plate-like members {folding margin member}. On the other hand, when this width is too large, a volume of the panel in a folded state is rather large, which is cumbersome when performing packaging, transportation, storage, and the like. A preferable thickness is obtained by multiplying a thickness of a single small plate-like member by a number obtained by subtracting 2 from a total number of small plate-like members.

The panel is folded as follows. First, the folding margin members are folded, thereby forming narrow and elongated spaces between laterally adjacent small plate-like members having the folding margin members therebetween. Then, the group of laterally adjacent small plate-like members having the narrow and elongated spaces therebetween are folded longitudinally toward the group of small plate-like members having the folding margin members therebetween. Next, lateral folding is effected in two steps. With the group of small plate-like members having the narrow and elongated spaces being on an inner side, the folding margin members are used as a hinge.

Alternatively, the panel may be folded as follows. First, a group of small plate-like members longitudinally adjacent to each other are folded toward a side. Next, a group of small plate-like members longitudinally folded are folded in a lateral direction. In this process, the small plate-like members laterally adjacent to each other are alternately folded to opposite sides. For example, when three small plate-like members are laterally connected to each other, a small plate-like member situated at one lateral end is folded onto an upper side of a central small plate-like member, and a small plate-like member situated at another lateral end is folded onto a lower side of the central small plate-like member.

In a foldable electric panel 100 shown in FIG. 1, a plural plate-like members, said plural plate-like members comprises (i) a first plate-like member 120, (ii) a second plate-like member 140, (iii) a third plate-like member 160; a flexible non-conductive material 128 attached to a surface of each of said plural plate-like members 120, 140, and 160 so as to interconnect said plural plate-like members 120, 140, and 160 such that said plural plate-like members 120, 140, and 160 are foldable, from an unfolded condition, into a folded condition by folding said second plate-like member 140 relative to said first plate-like member 120 about said first side 121 of said first plate-like member 120; and a first folding margin member 122 being connected to each of said first plate-like member 120 and said second plate-like member 140 via said flexible non-conductive material 128, wherein when said plural plate-like members are in the unfolded condition, and said first folding margin member 122 is between said first side of said first plate-like member 120 and said first side 141 of said second plate-like member 140.

The foldable panel 100 may further comprise a fourth plate-like member 170, which is configured to connect to the second plate-like member 140. The foldable panel 100 may comprise a folding margin member 172 connected to said fourth plate-like member 170 and said 2nd plate-like member 140 via said flexible non-conductive material 128. Alternatively, said fourth plate-like member 170 may be connected to said 2nd plate-like member 140 via a Velcro, zipper, for example.

The foldable panel further comprise a control system 150 and an electrical cord 152. The control system 150 may comprise an accelerometer, whereby when the foldable panel is tilted about 45 degree to one side, such as to the ground, the control system 150 will automatically shut off the electricity input to prevent fire hazard.

Figure 2:
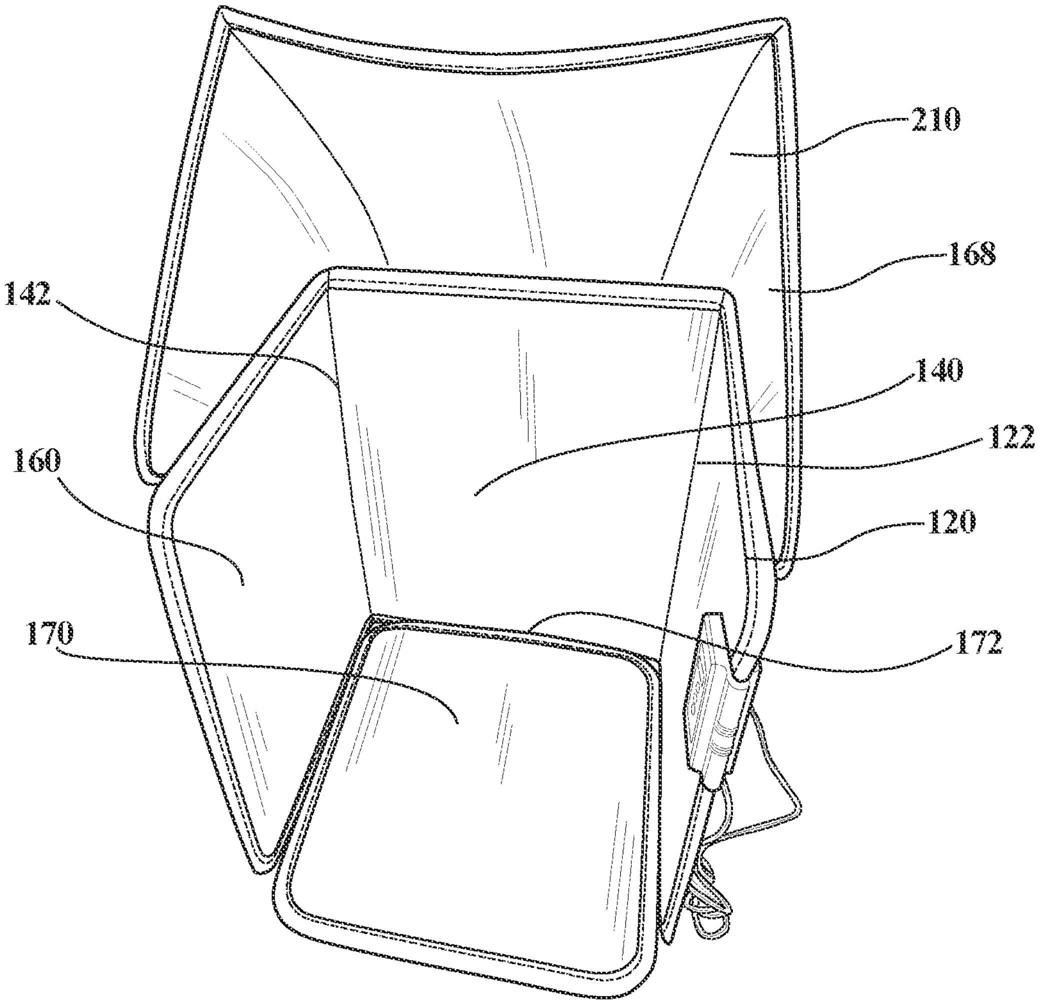
FIG. 2 is a perspective view of a foldable electric panel in use according to another embodiment.

As shown in FIG. 2, when in use, the foldable panel 100 may have the first plate-like member 120 foldable toward the second plate-like member 140 at about 90 degrees for example. The third plate-like member 160 may be foldable toward the second plate-like member 140 at about 90 degrees for example. The foldable panel 100 may further comprise a cover 210 to connect the first plate-like member 120, the second plate-like member 140, and the third plate-like member 160 to prevent the heat generated by the plate-like members 120, 140, 160, and 170, from dissipating quickly. The cover 210 may be connected to said first, the 2 nd, and the third plate-like members 120, 140, and 160 via a Velcro, zipper, for example.

Figure 3A:
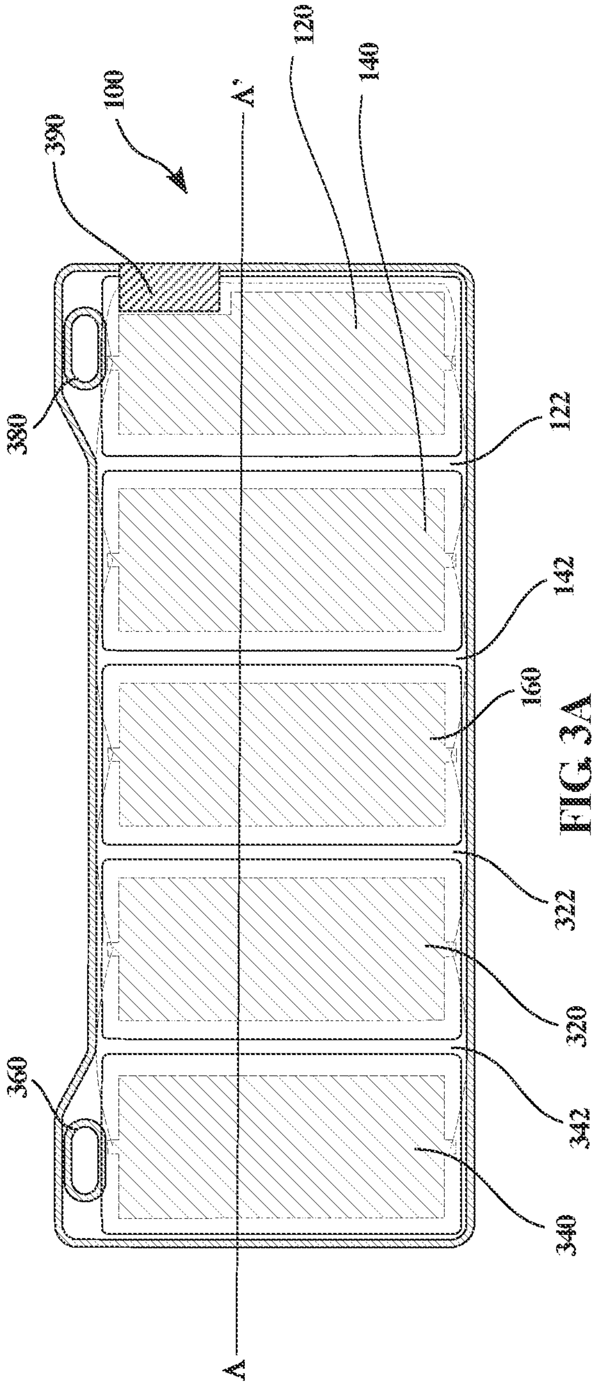
FIG. 3A is a plan view of a foldable electric panel according to another embodiment.

As shown in FIG. 3A, in another embodiment, the foldable panel 100 may further comprise a fourth plate-like member 320 and a fifth plate-like member 340. The foldable panel 100 may further comprise a third folding margin member 322 and a forth folding margin member 342. The third folding margin member 322 may be connected to the third plate-like member 160 and said fourth plate-like member 320 via said flexible non-conductive material 128. The fourth folding margin member 342 may be connected to said fourth plate-like member 320 and said fifth plate-like member 340 via said flexible non-conductive material 128. In one embodiment, plural plate-like members are each rectangular in shape such that said plural plate-like members, by being interconnected by said flexible non-conductive material 128, define a quadrangular configuration. In another embodiment, plural plate-like members may be in different shapes.

Figure 3B:
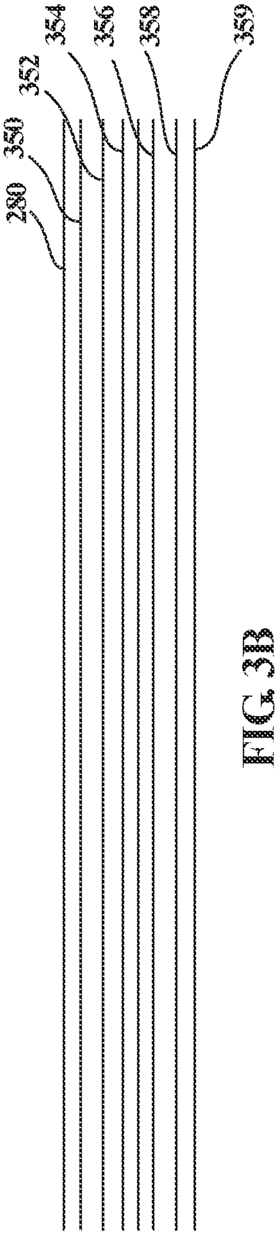
FIG. 3B is a cross-section view of the foldable electric panel based on A-A' of the FIG. 3A.

As shown in FIG. 3B, the plate-like member of the foldable panel 100 may further include a heating element 350. The heating element 350 may comprise electrically resistive material which may include a metal (e.g., aluminum) or metal alloy, for example. The resistive material may be wrapped by a layer of electrically insulating material. The electrically insulating material may be enamel or plastics material (e.g., a polyester resin). The heating element 350 may further include a first radiation emitting surface and a second interior surface.

The plate-like member, such as 120, 140, 160, 320, or 340, may further include a board 356 adhesively bonded to the second interior surface of the heating element 350.

Optionally, the plate-like member of the foldable panel 100 may further comprise an insulating material 352 between the second interior surface of the heating element 350 and the board 356. The insulating material can keep the heat generated by the heating element 350 from dissipating quickly.

The plate-like member of the foldable panel 100 may further comprise a backing member 359 attached to the board 356 of the plate-like member 100. Alternatively, the backing member 359 may be connected to the board 356 via glue 358, for example.

The backing member 359 may be attached to the board 356 of the first plate-like member 120, the second plate-like member 140, the third plate-like member 160, the fourth plate-like member 320, the fifth plate-like member 340, etc.

Alternatively, the foldable panel may have one plate-like member, instead of different plate-like members, which form a circle with a first end and a second end being connected by a connecting mechanism, such as a Velcro, locking mechanism, a zipper.

While reference has been made to specific embodiments, it is apparent that other embodiments and variations can be devised by others skilled in the art without departing from their spirit and scope. The appended claims are intended to be construed to include all such embodiments and equivalent variations.

I claim:

1. A foldable panel comprising:

an electronic controls stem wherein the electronic controls stem comprises an accelerometer, a plural plate-like members, said plural plate-like members including (i) a first plate-like member having (a) a heating element having a first radiation emitting surface and a second interior surface, and (b) a board adhesively bonded to said second interior surface, (ii) a second plate-like member having (a) a heating element having a first radiation emitting surface and a second interior surface, and (b) a board adhesively bonded to said second interior surface, (iii) a third plate-like member having
(a) a heating element having a first radiation emitting surface and a second interior surface, and
(b) a board adhesively bonded to said second interior surface, a flexible non-conductive material attached to a surface of each of said plural plate-like members from a top to a bottom so as to interconnect said plural plate-like members such that said plural plate-like members are foldable, from an unfolded condition, into a folded condition by folding said second plate-like member relative to said first plate-like member about said first side of said first plate-like member; and a first folding margin member being connected to each of said first plate-like member and said second plate-like member via said flexible non-conductive material, wherein when said plural plate-like members are in the unfolded condition, and said first folding margin member is between said first side of said first plate-like member and said first side of said second plate-like member.

2. The foldable panel according to claim 1 further comprising a fourth plate-like member having
(a) a heating element having a first radiation emitting surface and a second interior surface, and
(b) a board adhesively bonded to said second interior surface.

3. The foldable panel according to claim 2, further comprising a fifth plate-like member having
(a) a heating element having a first radiation emitting surface and a second interior surface, and
(b) a board adhesively bonded to said second interior surface.

4. The foldable panel according to claim 2, further comprising:
a second folding margin member connected to said second plate-like member and said third plate-like member via said flexible non-conductive material.

5. The foldable panel according to claim 3, wherein said plural plate-like members are each rectangular in shape such that said plural plate-like members, by being interconnected by said flexible non-conductive material, define a quadrangular configuration.

6. The foldable panel according to claim 4, further comprising:
a third folding margin member connected to said third plate-like member and said fourth plate-like member via said flexible non-conductive material.

7. The foldable panel according to claim 3, further comprising:
a fourth folding margin member connected to said fourth plate-like member and said fifth plate-like member via said flexible non-conductive material.

8. The foldable panel according to claim 3, further comprising a backing material attached to the board of the first plate-like member; the board of the second plate-like member; and the board of the third plate-like member.

9. The foldable panel according to claim 8, wherein the backing material is further attached to the board of the fourth plate-like member.

10. The foldable panel according to claim 9, wherein the backing material further is attached to the board of the fifth plate-like member.

11. A foldable panel comprising:
an electronic control system, wherein the electronic control system comprise an accelerometer;

a plural plate-like members, said plural plate-like members including
(i) a first plate-like member having
(a) a heating element having a first radiation emitting surface and a second interior surface, and
(b) a board adhesively bonded to said second interior surface,
(ii) a second plate-like member having
(a) a heating element having a first radiation emitting surface and a second interior surface, and a flexible non-conductive material attached to a surface of each of said plural plate-like members so as to interconnect said plural plate-like members such that said plural plate-like members are foldable, from an unfolded condition, into a folded condition by folding said second plate-like member relative to said first plate-like member about said first side of said first plate-like member;

a backing material attached to the board of the first plate-like member; the board of the second plate-like member; and a first folding margin member being connected to each of said first plate-like member and said second plate-like member via said flexible non-conductive material from a top to a bottom, wherein when said plural plate-like members are in the unfolded condition, and said first folding margin member is between said first side of said first plate-like member and said first side of said second plate-like member.

12. The foldable panel according to claim 11 further comprising a third plate-like member having
(a) a heating element having a first radiation emitting surface and a second interior surface, and
(b) a board adhesively bonded to said second interior surface.

13. The foldable panel according to claim 12, further comprising a fourth plate-like member having
(a) a heating element having a first radiation emitting surface and a second interior surface, and
(b) a board adhesively bonded to said second interior surface.

14. The foldable panel according to claim 13, further comprising a fifth plate-like member having
(a) a heating element having a first radiation emitting surface and a second interior surface, and
(b) a board adhesively bonded to said second interior surface.

15. The foldable panel according to claim 12, further comprising:
a second folding margin member connected to said second plate-like member and said third plate-like member via said flexible non-conductive material.

16. The foldable panel according to claim 13, further comprising:
a third folding margin member connected to said third plate-like member and said fourth plate-like member via said flexible non-conductive material.

17. The foldable panel according to claim 14, further comprising:
a fourth folding margin member connected to said fourth plate-like member and said fifth plate-like member via said flexible non-conductive material.

18. The foldable panel according to claim 13, wherein the fourth plate-like member is configured to connect to the second plate-like member.

19. The foldable panel according to claim 17 further comprising a fifth folding margin member connected to said fourth plate-like member and said 2nd plate-like member via said flexible non-conductive material.

* * * * *